United States Patent Office 3,355,365
Patented Nov. 28, 1967

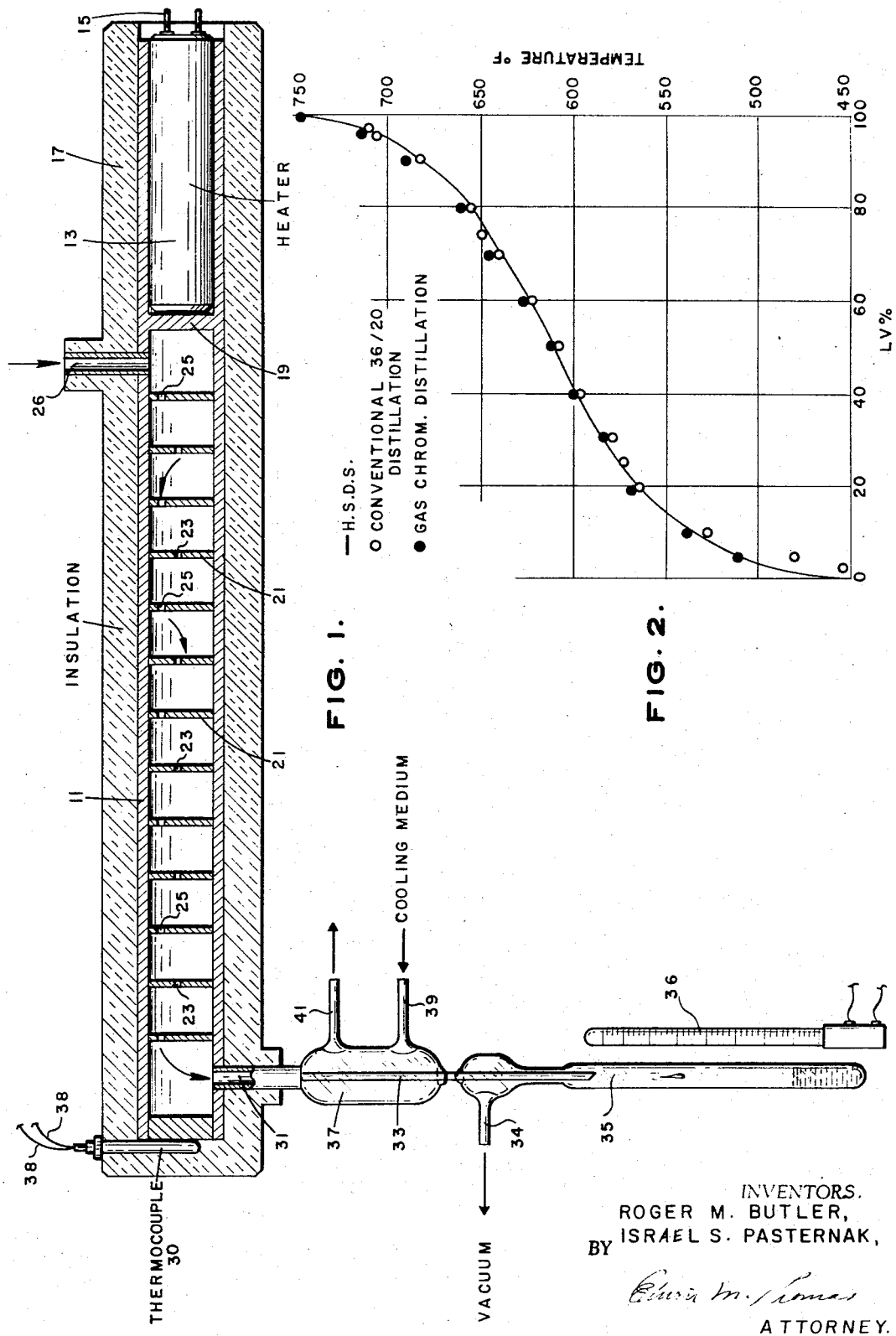

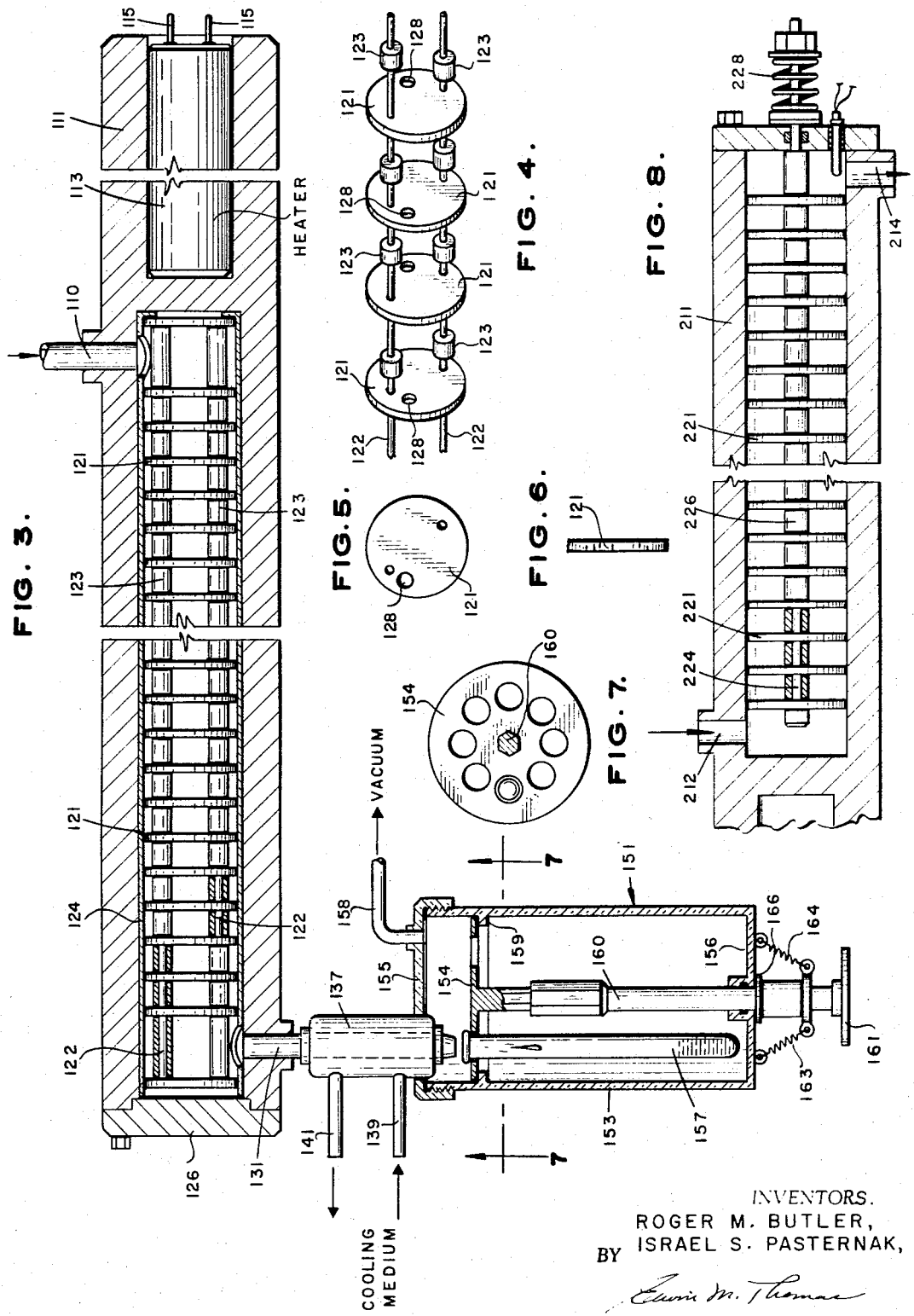

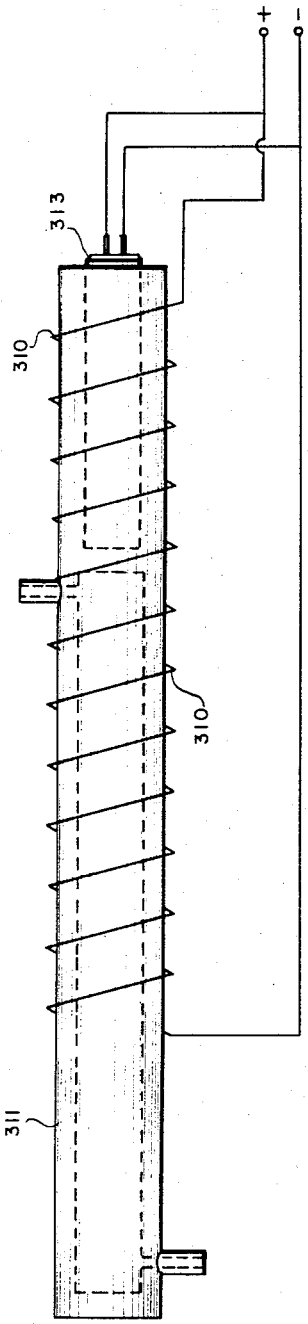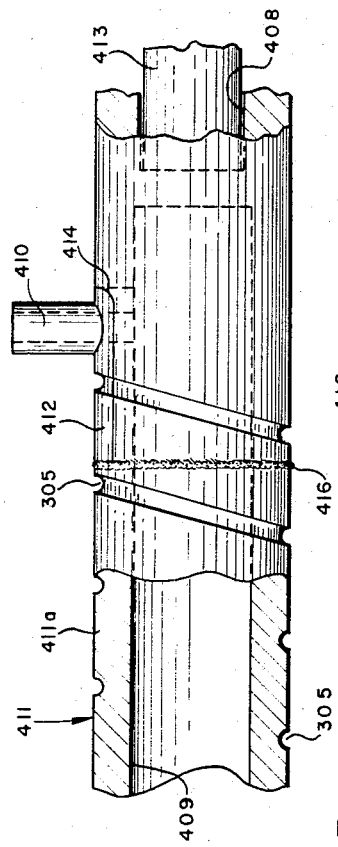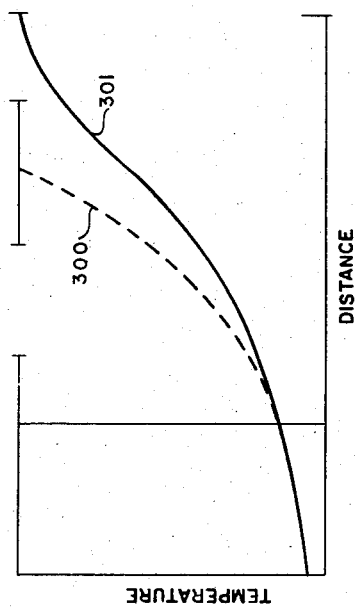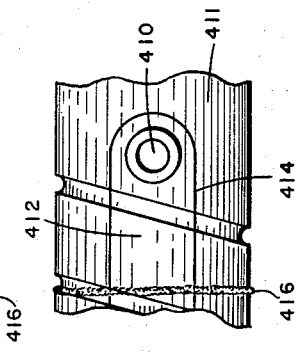

3,355,365
HORIZONTAL DISTILLATION ANALYZER WITH PLURAL DISTILLATE RECEIVERS
Roger M. Butler and Israel S. Pasternak, Sarnia, Ontario, Canada, assignors to Esso Research and Engineering Company, a corporation of Delaware
Filed July 2, 1964, Ser. No. 379,824
8 Claims. (Cl. 202—197)

The present invention relates to an improved distillation apparatus and method. It has particular application to a high efficiency distillation apparatus designed for making rapid separations of small quantities of various materials. It is particularly suitable for analysis of high boiling organic materials although it can be applied to many substances. The invention relates particularly, also, to an improved method of obtaining an analysis of materials which have hitherto been difficult to analyze or separate into their constituents in small quantities.

In the past there has long been a particular need for an efficient high-speed laboratory still suitable for obtaining distillation curves for small samples of petroleum fractions. This is especially true of high boiling hydrocarbon materials, for example materials derived from petroleum that boil at temperatures around 250° to 300° F. and higher. In the petroleum industry, and in chemical industry generally, there is need for frequent and accurate distillation analysis of many and various materials. Products produced in large quantities, such as blends of paraffins, virgin and catalytic cracked light and heavy gas oils, vacuum gas oils, reduced crudes, light, intermediate and heavy lubricating oils, heavy detergent alkylates, steam cracker tars, pitches, etc., require frequent and repetitive fractionation for process and product quality control. Generally speaking, in the prior art, high efficiency separations of such have required long and intricate distillation columns. Long columns necessarily have high hold ups. Consequently, relatively large charges must be employed to obtain reasonable recoveries and reasonably accurate analyses.

The gas chromatograph is a very useful device for obtaining data by fractionation of very small quantities of various materials, including some that are fairly high boiling. However, in gas chromatography, the fractions leaving the column are necessarily diluted with carrier gas. Consequently, even in programmed temperature chromatography, the column temperature is not simply and directly related to the boiling points of the fractions recovered. Nor can quantitative data on the various fractions be obtained accurately in many cases. Complicated and periodic calibrations are necessary. Particularly with high boiling samples, it is difficult by gas chromatography to obtain rapid and complete evaporation of the charge at the point of introduction. Indeed, with fractions containing heavy residual material such as crude petroleum contains, such complete vaporization is often impossible. Hence, one difficulty which is often encountered is that of having to decide what fraction of the feed charge is to be represented by the total chromatogram.

In order to overcome the above and other difficulties, the present invention was devised. It involves development of an apparatus which combines some of the features and advantages of standard distillation equipment with some of those of the chromatograph. By this means it is possible to use a rather small charge, for example 2 to 20 milliliters, preferably between about 5 and 10 milliliters in most cases. With these quantities, much smaller than required for convention distillation, one can obtain entirely satisfactory results. As in chromatography, the flow of material through, is unidirectional. This is an advantage over conventional distillation. Also distillation is carried out under the action of an applied temperature gradient along a horizontal column. However, unlike gas chromatography, there is no need for use of a carrier gas. This eliminates many difficulties. The entire vapor flow is created by the boiling of the sample itself. Consequently, the temperature at the outlet end of the column is a direct measure of the boiling point of the fraction emerging. Hence calibration in terms of time, as is required in gas chromatography, is unnecessary in order to determine the composition.

By using a charge of intermediate size, for example 5 to 10 milliliters, the volume of distillate obtained as each fraction is vaporized can be collected separately and measured directly as in conventional distillation. This greatly simplifies the process. It makes the whole equipment only slightly more complicated than that required for simple standard ASTM distillation tests, as practised conventionally in petroleum refineries.

According to the present invention, a multiplate column, in effect, is made up of a hollow bar of metal having multiple partition plates therein. A temperature gradient is applied to the bar or column by heating one end of the structure and letting conductivity of the structure distribute it. The hollow bar or thick wall tube is fabricated of highly heat conductive material, such as copper, silver or aluminum. Heat is applied largely or entirely near one end of the bar. The heat source is controlled in such a manner that the temperature level is gradually increased while maintaining a temperature gradient throughout the column. The continuous heating with gradual rise in temperature level is comparable to that employed in a programmed temperature gas chromatograph. However, in contrast to the chromatograph, an intentional temperature gradient is maintained and the rate of heating is not particularly critical. Hence no special precautions to control such rate are required. The boiling points of components emerging from the column are obtained by simply measuring the temperature at the outlet end of the metal bar which constitutes the column. Thus, any suitable temperature measuring device, such as a conventional thermometer or thermocouple, may be used for this purpose.

Also, in contrast to conventional distillation, the measurement of temperature for high vacuum distillation requires no special precautions with the apparatus of the present invention.

The present invention is based in part on the discovery previously intimated that a generally suitable temperature gradient can be obtained simply by applying the heat, or most of it, to one end of a good conducting metal bar or hollow, thickwalled tube. The apparatus thus consists, in general terms, of a series of perforate transverse partitions or baffles, preferably in the form of disks spaced from each other and so arranged with flow passages as to require the vapors to pass through a sinuous or tortuous path and to leave a series of liquid reservoirs between the disks. A desired temperature gradient is established along the hollow bar or tube. This may be controlled manually, or by means of conventional differential controllers if desired. As temperatures across the column are raised each fraction in the feed is continuously evaporated and condensed repeatedly in its tortuous movement through the transverse partitions as they flow towards the cooler end of the column.

The lighter fractions move along the column before the heavier ones, since they evaporate and condense at lower temperatures. Hence, during the evaporation applied to a sample of wide boiling range, the vapors first become richer in the lighter components and separation is effected. Efficiency of separation depends to a large extent on the temperature gradient across the column. It depends also on the number of disks in the column and the length of the column. According to the present invention, a large number of disks can be arranged in a column of relatively short but adequate length. Hence the device as a whole becomes a very simple structure.

The column of the present invention is preferably operated under vacuum, particularly when small samples are used. Otherwise vapor hold-up in the column at the end of a run may prevent complete distillation. This factor, however, does not limit the usefulness of the column for distilling low boiling feeds. When low boiling materials are distilled, the column of course must be cooled to an initial temperature below that at which the lowest boiling feed component will vaporize. For this purpose cooling means, e.g. from a refrigeration source, may be applied to the heat conductive column. The instrument also can be made automatic by applying simple conventional automation techniques well known in the art. It provides complete high efficiency distillation curves for practically all types of petroleum stream as well as streams of many organic materials.

The invention will be more fully understood by referring to the annexed drawings and to the detailed description which follows:

In the drawings, FIGURE 1 is a sectional view in elevation and partly diagrammatic, showing the general type of apparatus only, but in enough detail to illustrate its method of operation.

FIGURE 2 is a typical distillation curve obtained from the apparatus of FIGURE 1.

FIGURE 3 is an elevational view, showing more details than FIGURE 1, of a preferred form of apparatus, with certain parts cut away or shown in section to expose the inner structure more adequately.

FIGURE 4 is a detailed view showing, in expanded relationship, part of a series of disks assembled and used according to the present invention.

FIGURE 5 is an elevational view of one of the disks of FIGURE 4, and FIGURE 6 is an edge view.

FIGURE 7 is a horizontal sectional view, taken substantially on the line 7—7 of FIGURE 3, showing a holding plate or a disk for multiplicity of sample tubes.

FIGURE 8 is a diagrammatic representation of a different and somewhat simpler form of assembly, employing the same general principles as the apparatus of FIGURE 3.

FIGURE 9 is an elevational view, partly diagrammatic, showing a system similar to that of FIGURE 3, for improving the temperature gradient as is useful for certain purposes.

FIGURE 10 is a comparative graph showing changes in temperature gradient due to the type of heating illustrated in FIGURE 9.

FIGURE 11 is a detailed fragmentary side view of a column, showing one way of arranging the heating system of FIGURE 9.

FIGURE 12 is a detailed view showing one aspect of FIGURE 11.

Referring now to the drawings, FIGURE 1 shows a horizontal bar or column consisting of a cylindrical bar or thick-walled tube 11 of a good heat conducting metal, preferably copper, although aluminum or silver may be used. Various alloys also may be used, as will be obvious. At its right end, the hollow bar contains an electric heating cartridge 13 of conventional type having electrodes 15 adapted to be connected to conventional electric power sources. The tube is insulated throughout its length with a wrapping 17 of suitable heat insulating materials, such as asbestos, glass wool fiber, or other fibrous or expanded mineral materials commonly employed for such purposes. Inside the tube a barrier 19 is provided behind the heating cartridge, followed by a series of disks 21 arranged at rather closely spaced intervals. These disks are each provided with an opening or perforation through which vapors may pass as indicated at 23, 25. These openings are preferably staggered so as to require the vapors to pass through a sinuous or tortuous path on their way towards the exit. A sample to be distilled is introduced through inlet 26. Heat is applied to the heating cartridge 13 through a conventional temperature controlling device such as a rheostat, although automatic equipment may be used for this purpose if desired. In automated control systems the latter of course would be used. As the temperature increases, portions of the sample are vaporized, the most volatile passing first towards the left through the tortuous path, as previously described. The emerging vapors pass through outlet 31 into a tube 33. Tube 33 is surrounded by a cooling chamber 37 supplied with a suitable heat exchange fluid such as water, Dowtherm, or some other liquid heat exchange material introduced through inlet 39 and removed through outlet 41. This condenses the vapors to liquid and the liquid passes into a collector 35. Vacuum may be applied to the collector 35 through a connection 37 to reduce the pressure within the column to any desired level. A suitable operating pressure is usually between 2 and 50 milliliters of mercury, a pressure of about 5 to 10 milliliters absolute being commonly preferred. A liquid volume measuring device 36 is arranged alongside of the sample collector. A thermocouple 37 is provided at the outlet end of the bar 11, being connected by suitable recording leads 38 to a temperature recording device.

Referring next to FIGURE 3, there is shown an apparatus of the same general type as that of FIGURE 1 with certain mechanical details of assembly added. Here the insulation is eliminated, for purposes of clearer illustration. The column comprises a heat conductive hollow bar 111 of metal, e.g., copper. A heat cartridge 113 is provided with electrodes 115 as in the case of the structure shown in FIGURE 1. A sample inlet is provided at 110 and a series of perforated disks 121 are assembled within a thin wall sleeve 124 so that the whole disk assembly may be made of a corrosion resistant metal such as stainless steel. In order to provide good thermal contact it is convenient to cast the copper bar 111 around the stainless steel sleeve 124.

As shown in FIGURE 4, the disks are assembled on a pair of rods 122 with spacers 123 between each pair of disks. Each of the disks is provided with an opening 128. The disks are alternately arranged on the rods so that the opening 128 of one is to the upper right, and the next to the upper left of center. The holes are made in the disks off center, preferably on a line which passes upwards through the axis at about 45 degrees to right or left of horizontal. By reversing the facing of alternate disks, they may be punched exactly alike and still assembled in the desired manner.

Arranged to collect samples of the distillate as it passes out of the column is the receiver shown in the lower left part of FIGURE 3. It comprises outlet line 131 from the column which connects to a condenser 137. Condenser 137 is provided with inlet and outlet lines 139, 141 for heat exchange fluid. Below the condenser a multiple sample holding device is indicated generally at 151. It comprises a cylindrical outer vessel 153 equipped with gas tight upper and lower heads 155 and 156 and has a vacuum attachment 158. A perforated disk 154, see FIGURE 7, is mounted inside the cylinder, resting on a suitable ledge 159 on which it can be rotated without displacement. This device is adapted to hold a plurality of test tubes or collecting vessels 157. The disk 154 is mounted on a rotatable post 160 provided with a handle 161 extending through the bottom end wall or head 156 in gas tight relationship. A pair of springs 163 and 164 connected to a cross bar 165 and to the outer container holds the shoulder 166 of the handle firmly against the bottom of the plate or wall 156 to prevent gas leakage. This spring arrangement also provides frictional resistance against accidental misplacement of the test tubes 157. The latter can be rotated into position sequentially under the outlet of the condenser 137 to receive the liquefied samples or fractions as they are discharged. By this means vacuum may be applied to the outlet system as a whole but the liquid samples will still collect in individual test tubes. The disk 154 can be rotated stepwise manually or by automatic mechanical means, not shown, to collect fractions of different boiling points, as will be obvious.

Referring next to FIGURE 8 there is shown a somewhat simpler form of apparatus embodying the same principles as that shown in FIGURE 3. In this case the metal bar, of copper or the like, is indicated at 211 and it has an inlet 212 and an outlet 214 for the material to be fractionated therein. The material passes in this case from left to right through a series of disks 221 assembled on a centrally located rod 224 passing through a hole in each disk, the disks being spaced by washers 226 placed between alternate disks. These disks are provided with suitable perforations to cause the vapors to pass through a tortuous path before emerging to the collection apparatus which may be attached at 214. The device may be heated in the same manner as that of FIGURE 3. The heating means are not shown in this modification. In this case there is no liner corresponding to element 124 of FIGURE 3. Instead, the disks are carefully fitted to form a fluid tight seal around their peripheries inside the smooth bore of hollow bar 211. Suitable clamping or tensioning means 228 on the outer end of rod 224 hold all the parts in proper assembled relationship. The apparatus is designed so that a vacuum may be attached to the outlet from 214 so as to maintain any suitable degree of vacuum for example, 10 millimetres of mercury.

Referring next to FIGURE 9 it may be desirable in some cases to modify the temperature gradient so as to flatten it. As indicated in FIGURE 10, where all the heat is supplied from a cartridge such as 113, FIGURE 3, or 313, FIGURE 9, which cartridge is inserted in an opening in the end of bar 311, the temperature gradient may be extremely steep at the hot end of the bar. This is indicated by the dotted line 300, FIGURE 10. By providing a supplemental heating arrangement, such as a spiral heating coil wrapped around the bar, as indicated at 310, the gradient may be flattened out as much as desired as indicated in solid line 301, FIGURE 10.

Referring to FIGURE 11 a bar 411 is provided with a cartridge type heater 413, similar in all respects to those in the previously described examples. This heating cartridge, however, is supplemented by a heating element to be wound into a spiral groove 305. The bar is thus adapted to receive a wrapping of resistance heater wire, such as is represented by the coil 310 of FIGURE 9. The latter is omitted for a clearer illustration in FIGURE 11. The cylinder or column is usually made in two or more parts which are later assembled.

The manner in which the parts are assembled is of considerable importance in obtaining a satisfactory temperature gradient. It is much preferred that the elements of the bar or cylinder itself be fastened together in such a way as to eliminate any marked steps in the temperature gradient. In the case of FIGURE 11, this is accomplished by two procedures. The bar or column 411 is made in two main parts, that to the left being indicated at 411a. This arrangement is made so that the cartridge 413 can be fitted into a bore at the right end of bar 411, which may be separately bored to a different diameter 408 from the main bore indicated at 409 in the other part. The latter is designed to receive the disk assembly. The inlet tube 410, which is similar to tubes 310, FIGURE 9, and 110, FIGURE 3, is preferably fitted into a separable block 412. The latter fits into an appropriate pre-cut recess 414. This is better shown in FIGURE 12. The block 412 is soldered into the opening 414 by silver solder. Preferably, the two bar elements are assembled in abutting relationship by means of a silver solder seam indicated at 416.

In other respects, the apparatus of FIGURES 9, 11 and 12 is essentially the same as that of FIGURE 3. It will be understood that in all cases it is usually desirable to provide adequate insulation outside the bar and its heating means, so as to keep better control over the temperature gradient.

In operation, a small sample, for example, 5 grams or milliliters of a high boiling petroleum residue, is introduced through the opening 26, FIGURE 1 or 310, etc., in the other figures. The temperature of the column is then gradually raised, preferably at a reasonably constant rate. Components of the sample begin to distill through the apparatus to the collector 151, FIGURE 3. Here they are condensed as they pass through condenser 137 and a given component may be collected in a test tube or specimen container 157. When collection of this component is completed, the next test tube or container 155 may be rotated into position and the second component collected. The volume of each component may be accurately measured. This gives a direct, accurately measurable indication of the amount of each of the various components in the sample. It is a more satisfactory quantitative method, for many materials, than the gas chromatograph charting technique, being more accurate in many cases.

To test the accuracy of the system, a heavy atmospheric gas oil was subjected to standard 36/20 distillation in the common type of laboratory still. A similar sample was subjected to a gas chromatograph distillation and still another sample to distillation in the apparatus of the present invention which is indicated as HSDS (horizontal stacked disk still). FIGURE 2 shows the results and indicates how closely reproducible the results of the present invention are, compared with prior art methods which are widely accepted. In this case a 5-milliliter sample was used in the HSDS. Other test, on various materials such as light atmospheric gas oils, intermediate lubricating oils, reduced crudes, heavy lubricating oils, vacuum tower pitches and the like, showed comparable results.

It will be appreciated that various changes can be made in the apparatus and in the method of its operation without departing from the spirit and purpose of the invention. It is intended by the claims which follow to cover such invention, as broadly as the prior art properly permits.

What is claimed is:

1. Apparatus for distilling and analyzing small quantities of high boiling materials and the like, comprising a hollow heat conducting bar horizontally positioned containing a series of spaced perforated disks, means for passing a sample of the material to be tested through said series of disks, heating means at one end of the bar and insulating means for establishing a temperature gradient along said bar with the temperature decreasing from the point of feed introduction to its exit, and means for receiving samples of materials distilled through said system.

2. Apparatus according to claim 1 wherein the temperature gradient is established primarily by a cartridge heating element inserted in one end of the heat conductive bar.

3. Apparatus according to claim 1 wherein the bar is a metal bar of heavy wall structure.

4. Apparatus according to claim 1 wherein the bar is of copper.

5. In apparatus of the character described, a horizontal bar of highly heat conductive metal hollowed at one end to receive a heating device and hollowed for a greater length from the other end to form a distillation chamber, a heating cartridge in said first hollowed end to apply a controlled temperature gradient to said bar, a series of spaced transversely positioned perforate plates arranged within the hollow of greater length, means for inserting a sample to be analyzed into one end of said hollow of greater length, temperature measuring means connected to the upper end of said hollow of greater length, a condenser connected to the other end of said hollow of greater length, and selective means connected with said condenser for receiving condensed fractions of said sample for direct volumetric analysis thereof.

6. Apparatus according to claim 5 wherein the condenser-receiver means are provided with a connector for applying vacuum.

7. In a distillation apparatus, the combination of a horizontal hollow bar of highly heat conductive metal, a heating device for one end of said bar to establish a controlled temperature gradient throughout the length of said bar, a series of transverse plates arranged within said hollow bar in fluid tight relation except for alternately staggered perforations in successive plates to compel vapors to follow a tortuous path, a vapor outlet after the last plate, temperature measuring means located within said vapor outlet to measure the temperature of said vapor, a condenser connected to said outlet, a selective receiver adapted to receive and store separate liquid fractions from said condenser, and means for applying a vacuum to the system.

8. Combination according to claim 7 wherein additional heating means are provided along the bar to modify its temperature gradient.

References Cited

UNITED STATES PATENTS

| | | | |
|---|---|---|---|
| 1,742,258 | 1/1930 | Kahl | 203—81 X |
| 1,881,718 | 10/1932 | Lawrie | 203—86 |
| 1,946,467 | 2/1934 | Bergholm et al. | |
| 2,198,848 | 4/1940 | Von Elbe | 203—100 X |
| 2,459,375 | 1/1949 | Gould | 202—207 |
| 2,595,948 | 5/1952 | Jones | 202—206 X |
| 2,622,062 | 12/1952 | Putt | 202—202 X |
| 2,723,228 | 11/1955 | Moore | 203—86 X |
| 2,954,330 | 9/1960 | Schmieding et al. | 202—158 |

NORMAN YUDKOFF, *Primary Examiner.*

J. B. DONIHEE, D. EDWARDS, *Assistant Examiners.*